United States Patent
Zhao et al.

(10) Patent No.: US 8,220,511 B2
(45) Date of Patent: Jul. 17, 2012

(54) PNEUMATIC TIRE HAVING AN INNERLINER COMPRISED OF BUTYL RUBBER AND DISPERSION OF ETHYLENE VINYL ALCOHOL POLYMER

(75) Inventors: Junling Zhao, Hudson, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 693 days.

(21) Appl. No.: 12/099,177

(22) Filed: Apr. 8, 2008

(65) Prior Publication Data
US 2009/0250152 A1 Oct. 8, 2009

(51) Int. Cl.
*B60C 1/00* (2006.01)
*B60C 5/14* (2006.01)

(52) U.S. Cl. ........................ 152/510; 152/450

(58) Field of Classification Search .................... 152/511
See application file for complete search history.

(56) References Cited

U.S. PATENT DOCUMENTS

| 2005/0027058 A1* | 2/2005 | Dias et al. ...................... 524/445 |
| 2006/0000532 A1 | 1/2006 | Sandstrom ................... 152/510 |

FOREIGN PATENT DOCUMENTS

| EP | 337279 | 10/1989 |
| EP | 931815 | 7/1999 |
| EP | 1086830 | 3/2001 |
| EP | 1580232 | 9/2005 |
| EP | 1612242 | 1/2006 |
| JP | 2004-224963 | * 8/2004 |
| JP | 2007291256 | * 11/2007 |

OTHER PUBLICATIONS

European Search Report completed Jul. 29, 2009.

* cited by examiner

*Primary Examiner* — Justin Fischer
(74) *Attorney, Agent, or Firm* — Henry C. Young, Jr.

(57) ABSTRACT

The present invention relates to a pneumatic rubber tire having an integral innerliner of a sulfur cured rubber composition. The innerliner rubber composition is comprised of at least one elastomer selected from bromobutyl rubber and chlorobutyl rubber which also contains a dispersion therein of ethylene vinyl alcohol polymer.

6 Claims, No Drawings

PNEUMATIC TIRE HAVING AN INNERLINER COMPRISED OF BUTYL RUBBER AND DISPERSION OF ETHYLENE VINYL ALCOHOL POLYMER

FIELD OF THE INVENTION

The present invention relates to a pneumatic rubber tire having an integral innerliner of a sulfur cured rubber composition. The innerliner rubber composition is comprised of at least one elastomer selected from butyl rubber, bromobutyl rubber and chlorobutyl rubber which also contains a dispersion therein of ethylene vinyl alcohol polymer.

BACKGROUND OF THE INVENTION

The inner surface of a pneumatic tire is typically comprised of an elastomeric composition designed to prevent or retard the permeation of air and moisture into the carcass from the tire's inner air chamber. It is often referred to as an innerliner. Rubbers, such as halobutyl rubber and blends of butyl and halobutyl rubber, which are relatively impermeable to air are often used as a major proportion of the innerliners.

Accordingly, the air and moisture permeability resistance of the innerliner rubber composition is an important consideration.

The innerliner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

There remains an ongoing desire to provide enhanced or suitable variations of butyl rubber-based tire innerliners without significantly affecting the air and moisture permeability resistance of the innerliner rubber composition.

In the description of the invention, the term "phr" relates to parts by weight of a particular ingredient per 100 parts by weight of rubber contained in a rubber composition. The terms "rubber" and "elastomer" are used interchangeably unless otherwise indicated, the terms "cure" and "vulcanize" may be used interchangeably unless otherwise indicated and the terms "rubber composition" and "rubber compound" may be used interchangeably unless otherwise indicated. The term "butyl type rubber" is used herein to refer to butyl rubber (copolymer of isobutylene with a minor amount comprised of, for example about 1 to about 3 percent, of units derived from isoprene), and halobutyl rubber as chlorobutyl rubber and bromobutyl rubber (chlorinated and brominated butyl rubber, respectively) unless otherwise indicated. The term "partially depolymerized butyl rubber", as used herein, is intended to be an ingredient other than an elastomer.

The term "Tm" relates to a melt point, or melting point, of a polymer, normally determined by a differential scanning calorimeter (DSC) with a temperature rise of from 3° C. to 10° C. per minute. The choice of temperature rise depends largely upon accuracy desired, with the 3° C. rise expected to be of greater accuracy, although a 10° C. temperature rise may often be used. The normal procedural aspect would be understood by one having skill in such art.

SUMMARY AND PRACTICE OF THE INVENTION

The present invention relates to a pneumatic rubber tire having an integral innerliner of a sulfur cured rubber composition. The innerliner is of a rubber composition comprised of, based upon parts by weight per 100 parts by weight of total rubber (phr), (A) 100 phr of elastomers comprised of:
  (1) a butyl type rubber (not a partially depolymerized butyl type rubber) as:
    (a) about 60 to 100, alternately about 60 to about 95, alternately about 60 to about 90 and alternately from about 60 to about 85, phr of halobutyl rubber selected from at least one of bromobutyl rubber and chlorobutyl rubber (halogenated butyl rubber) and their mixtures, and
    (b) zero to about 30, alternately from about 5 to about 20, phr of butyl rubber (non-halogenated butyl rubber);
  (2) zero to about 40, and, depending upon the content, or level, of halogenated butyl rubber and of butyl rubber, if used, alternately from zero to about 30, zero to about 35, about 5 to about 30, about 5 to about 35, about 5 to about 40, phr of at least one diene-based elastomer selected from polymers of at least one of isoprene and 1,3-butadiene and copolymers of styrene and at least one of isoprene and 1,3-butadiene and their mixtures; preferably selected from styrene/butadiene copolymer, natural rubber and mixtures thereof, and
  (3) zero to about 30, alternately from about 5 to about 20, phr of at least one of partially depolymerized bromobutyl rubber, partially depolymerized chlorobutyl rubber, and partially depolymerized butyl rubber and their mixtures, and (B) from 2 to about 95, alternately about 30 to about 80, phr of ethylene vinyl alcohol copolymer having an ethylene content in a range of from about 20 to about 50 mole percent, preferably in a range of from about 30 to about 47 mole percent, of the copolymer, so long as the vinyl alcohol copolymer has a melting point (Tm) in a range of from about 150° C. to about 200° C., preferably below 190° C. and more preferably below 180° C.;

(C) about 30 to about 110, alternately about 40 to about 90, phr of reinforcing filler comprised of:
  (1) about 30 to about 110 phr of rubber reinforcing carbon black, or
  (2) about 5 to about 70 phr of rubber reinforcing carbon black and from about 25 to about 70 phr of synthetic amorphous precipitated silica aggregates together with a coupling agent (for said precipitated silica aggregates) having a moiety reactive with hydroxyl groups (e.g. silanol groups) on said precipitated silica aggregates and another different moiety interactive with said diene-based elastomer(s).

For a further embodiment of the invention, the innerliner composition contains at least one compatabilizer for said EVOH.

Such compatabilizer may be, for example, an elastomer having a functionality interactive with said EVOH, particularly the alcohol groups of the EVOH, (e.g. therefore an interactive functionality) comprised of, for example, an epoxy, carboxy, anhydride, sulphonyl chloride, carbonyl chloride, isocynate and maleated groups as well as brominated copolymers of isobutylene and p-methyl styrene.

Representative examples of such EVOH compatabilizers are, for example, epoxidized natural rubber (epoxidized cis 1,4-polyisoprene rubber) and brominated copolymer of isobutylene and p-methylstyrene.

For an additional embodiment of this invention, the innerliner composition contains a reactive alkylphenol-formaldehyde resin (reactive in a sense that it can react with various polymers as would be understood by one having skill in such art).

A representative of an ethylene vinyl alcohol copolymer is, for example, EVAL™ resin H171B from the Kurray Co., Ltd having an ethylene content of about 38 mole percent and a melting point (Tm) of about 175° C.

An ethylene vinyl alcohol copolymer may have a molecular weight (weight average), for example in a range of from about 11,000 to about 60,000, so long as it has a melting point (Tm) in the aforesaid range of from about 150° C. to about 200° C., preferably below 190° C. and more preferably below 180° C.

A significant aspect of this invention is the providing of a tire innerliner with suitable air permeability resistance comprised of a butyl rubber (e.g. bromobutyl rubber) with an inclusion of an ethylene vinyl alcohol copolymer (EVOH), particularly with a compatabilizer for the EVOH, while substantially maintaining other significant physical properties.

In addition to the aforesaid elastomers and reinforcing fillers as carbon black and silica, for the tire innerliner, the innerliner rubber composition may also contain other conventional ingredients commonly used in rubber vulcanizates, for example, tackifier resins, processing aids, talc, clay, mica, antioxidants, antiozonants, stearic acid, activators, waxes and oils as may be desired. The said integral innerliner may contain, for example, at least one of talc, clay, mica and calcium carbonate, and their mixtures, in a range, for example, of about 2 to 25 phr depending upon various physical properties desired for the innerliner composition. Typical amounts of processing aids may, for example, range from about 1 to 15 phr. The presence and relative amounts of the above additives are not an aspect of the present invention.

The vulcanization of the compound for use as an innerliner is conducted in the presence of a sulfur vulcanizing agent. Examples of suitable sulfur vulcanizing agents include elemental sulfur (free sulfur) or sulfur donating vulcanizing agents, for example, an amine disulfide, polymeric disulfide or sulfur olefin adducts. Preferably, the sulfur vulcanizing agent is elemental sulfur. As known to those skilled in the art, sulfur vulcanizing agents are used in an amount ranging from about 0.2 to 5.0 phr with a range of from about 0.5 to 3.0 being preferred.

Accelerators are used to control the time and/or temperature required for vulcanization and to improve the properties of the vulcanizate. A single accelerator system may be used, i.e., primary accelerator in conventional amounts ranging from about 0.5 to 3.0 phr. In the alternative, combinations of 2 or more accelerators may be used which may consist of a primary accelerator which is generally used in the larger amount (0.3 to 3.0 phr), and a secondary accelerator which is generally used in smaller amounts (0.05 to 1.0 phr) in order to activate and to improve the properties of the vulcanizate. Combinations of these accelerators have been known to produce a synergistic effect on the final properties and are somewhat better than those produced by either accelerator alone. In addition, delayed action accelerators may be used which are not effected by normal processing temperatures but produce satisfactory cures at ordinary vulcanization temperatures. Suitable types of accelerators that may be used are amines, disulfides, guanidines, thioureas, thiazoles, thiurams, sulfenamides, dithiocarbamate and xanthates. Preferably, the primary accelerator is a disulfide or sulfenamide.

Various synthetic, amorphous silicas may be used for the tire innerliner composition, where it is desired that the innerliner composition contains a silica. Representative of such silicas are, for example and not intended to be limiting, precipitated silicas as, for example, HiSil 210™ and HiSil 243 ™ from PPG Industries, as well as various precipitated silicas from J.M. Huber Company, various precipitated silicas from Degussa Company and various precipitated silicas from Rhodia Company.

Various coupling agents may be used for the various synthetic, amorphous silicas, particularly the precipitated silicas, to couple the silica aggregates to various of the elastomers. Representative of such coupling agents are, for example and not intended to be limiting, bis(3-trialkoxysilylpropyl) polysulfides wherein at least two, and optionally all three, of its alkoxy groups are ethoxy groups and its polysulfidic bridge is comprised of an average of from about 2 to about 4, alternatively from about 2 to about 2.6 or an average of from about 3.4 to about 3.8 connecting sulfur atoms, and an alkoxyorganomercaptosilane which may optionally have its mercapto moiety blocked with a suitable blocking agent during the mixing thereof with the rubber composition, wherein said alkoxy group is preferably an ethoxy group.

In practice the innerliner rubber composition, or compound, is formed into a gum strip. As known to those skilled in the art, a gum strip is produced by a press or passing a rubber compound through a mill, calendar, multi-head extruder or other suitable means. Preferably, the gum strip is produced by a calendar because greater uniformity is believed to be provided. The uncured gum strip is then constructed as an inner surface (exposed inside surface) of an uncured rubber tire structure, also known as the carcass. The innerliner is then sulfur co-cured with the tire carcass during the tire curing operation under conditions of heat and pressure.

Vulcanization of the tire of the present invention is generally carried out, for example, at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot salt or in a salt bath. Preferably, the heating is accomplished in a press or mold in a method known to those skilled in the art of tire curing.

As a result of this vulcanization, the innerliner becomes an integral part of the tire by being co-cured therewith.

Therefore, in practice, the innerliner may, for example, be first constructed as an inner surface of an uncured rubber tire as an uncured compounded rubber gum strip and is then co-cured with the tire during a tire curing operation wherein the said rubber gum strip may have, for example, a thickness in the range of about 0.04 to about 1, alternately in a range of from about 0.05 to about 0.5, centimeters, depending somewhat the type, size and intended use of the tire.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE I

Samples of sulfur cured butyl rubber-type rubber compounds were prepared and referred to herein as rubber Samples A through E.

Rubber Sample A is a Control rubber sample comprised of bromobutyl rubber without an inclusion of ethylene vinyl alcohol copolymer (EVOH).

Experimental rubber Sample B was comprised of bromobutyl rubber containing a dispersion of an ethylene vinyl alcohol (EVOH) copolymer.

Experimental rubber Sample C was comprised of bromobutyl rubber containing a dispersion of an ethylene vinyl alcohol (EVOH) together with an epoxidized natural rubber compatabilizer for the EVOH copolymer.

Experimental rubber Sample D was comprised of bromobutyl rubber containing a dispersion of an ethylene vinyl alcohol (EVOH) together with a brominated copolymer of isobutylene and p-methylstyrene compatabilizer for the EVOH copolymer.

Experimental rubber Sample E was comprised of bromobutyl rubber, with a reduced carbon black content, containing a dispersion of an ethylene vinyl alcohol (EVOH) co-polymer together with an epoxidized natural rubber compatabilizer for the EVOH co-polymer and a reactive alkylphenol-formaldehyde resin.

The following Table 1 illustrates the respective rubber compositions.

The materials were mixed in a sequential two-step mixing process, namely a non-productive mixing step, followed by a productive mixing step in an internal rubber mixer, in which all of the ingredients, except for zinc oxide and accelerators, were mixed in the first, non-productive mixing step and the zinc oxide and accelerators were added in the subsequent productive mixing step in an internal rubber mixer. The rubber mixtures were dumped from the respective rubber mixer and cooled to below 40° C. between mixing steps. Such sequential procedural non-productive and productive rubber mixing steps are well known to those having skill in such art.

TABLE 1

| | Samples | | | | |
|---|---|---|---|---|---|
| | Control A | B | C | D | E |
| Non-Productive Mixing Step | | | | | |
| Bromobutyl rubber[1] | 100 | 100 | 80 | 80 | 80 |
| Epoxidized natural rubber[2] | 0 | 0 | 20 | 0 | 0 |
| EXXPRO ™[3] | 0 | 0 | 0 | 20 | 20 |
| Carbon black[4] | 50 | 50 | 50 | 50 | 30 |
| Tackifying resin[5] | 13 | 13 | 13 | 13 | 13 |
| Ethylene vinyl alcohol copolymer[6] | 0 | 43 | 43 | 43 | 43 |
| Alkylphenol-formaldehyde resin[7] | 0 | 0 | 0 | 0 | 5 |
| Productive Mixing Step | | | | | |
| Zinc oxide | 1 | 1 | 1 | 1 | 1 |
| Accelerators[8] | 1.4 | 1.4 | 1.4 | 1.4 | 1.4 |
| Sulfur | 0.5 | 0.5 | 0.5 | 0.5 | 0.5 |
| Stearic acid[9] | 0.5 | 0.5 | 0.5 | 0.5 | 0.5 |

[1]Bromobutyl rubber as Bromobutyl 2255 ™ from the ExxonMobil Company
[2]Epoxidized natural rubber as NR ENR-50 ™ from Goodyear Orient company PLT, Singapore
[3]Brominated copolymer of isobutylene and p-methylstyrene from Exxon Mobil
[4]N600 rubber reinforcing carbon black, an ASTM designation
[5]Blend of Koresin ™ resin from Struktol and SP1068 ™ phenol formaldehyde resin from Schenectady
[6]Ethylene vinyl alcohol as EVAL ™ resin H171B from the EVAL Company which reportedly has an ethylene content of about 38 mole percent and a melting point (Tm) of about 175° C.
[7]Reactive alkylphenol-formaldehyde resin as Tackirol ™ 201 from Taoka Chemical Co., Ltd
[8]Benzothiazyl disulfide and tetramethyl thiuram disulfide
[9]Primarily stearic acid (at least 90 weight percent stearic acid)

The following Table 2 reports physical data for various physical properties of the Samples. For cured rubber samples, the respective samples were cured for about 23 minutes to a temperature of about 170° C.

TABLE 2

| | Samples | | | | |
|---|---|---|---|---|---|
| | A | B | C | D | E |
| Ethylene vinyl alcohol copolymer (phr) | 0 | 43 | 43 | 43 | 43 |
| Epoxidized natural rubber (phr) | 0 | 0 | 20 | 0 | 0 |
| Brominated copolymer of isobutylene and p-methyl styrene compatabilizer (phr) | 0 | 0 | 0 | 20 | 20 |
| Alkylphenol-formaldehyde compatabilizer (phr) | 0 | 0 | 0 | 0 | 5 |
| Carbon black (phr) | 50 | 50 | 50 | 50 | 30 |
| Rheometer, 170° C. (MDR)[1] | | | | | |
| Maximum torque (dNm) | 5.4 | 5.0 | 4.9 | 4.5 | 6.3 |
| Minimum torque (dNm) | 2.2 | 2.7 | 2.7 | 2.3 | 2.1 |
| Delta torque (dNm) | 3.2 | 2.3 | 2.2 | 2.2 | 4.2 |
| T90, minutes | 7 | 21 | 9 | 20 | 23 |
| Stress-strain (ATS)[2] | | | | | |
| Tensile strength (MPa) | 11.3 | 8.5 | 10.1 | 8.4 | 10.1 |
| Elongation at break (%) | 756 | 348 | 209 | 305 | 345 |
| 200% modulus (MPa) | 2.1 | 5.9 | 8.2 | 6.7 | 6.8 |
| Rebound (%) | | | | | |
| 23° C. | 10 | 12 | 14 | 12 | 10 |
| 100° C. | 51 | 45 | 44 | 44 | 42 |
| Hardness (Shore A)[3] | | | | | |
| 23° C. | 53 | 79 | 88 | 75 | 67 |
| 100° C. | 38 | 38 | 64 | 48 | 36 |
| Relative air permeability rate resistance[4] Sample A is assigned a value of 100 (higher is better - greater resistance) | 100 | 48 | 150 | 166 | 359 |
| Relative oxygen permeability rate resistance[4] Sample A is assigned a value of 100 (higher is better - greater resistance) | 100 | 137 | 176 | 159 | 220 |
| Brittleness temperature ($T_b$), ° C.[5] | −36 | −34 | −33 | −33 | −33 |

[1]Data according to Moving Die Rheometer instrument, model MDR-2000 by Alpha Technologies, used for determining cure characteristics of elastomeric materials, such as for example Torque and T90.
[2]Data according to Automated Testing System instrument by the Instron Corporation which incorporates six tests in one system. Such instrument may determine ultimate tensile, ultimate elongation and moduli.
[3]Shore A hardness according to ASTM D-1415
[4]permeability according to (ASTM D-143 for air permeability and ASTM D-3985 for oxygen permeability), compared to a normalized value of 100 for Sample A, where a higher reported value relates to a higher permeability resistance.
[5]Brittleness temperature according to ASTM D-746.

From Table 2 it is observed, that for Experimental Sample B, the inclusion of the EVOH co-polymer in the bromobutyl rubber matrix (without the compatabilizer) significantly improved the resistance to oxygen permeation as compared to Control Sample A without the EVOH. However, the resistance to air permeation was lower than Control A.

For Experimental Sample C, it is observed that the addition of the epoxidized natural rubber compatabilizer with the EVOH inclusion significantly improved both the resistance to oxygen permeation and to air permeation as compared to Control Sample A which did not contain the EVOH and Experimental Sample B with the EVOH but without the compatabilizer.

For Experimental Sample D, it is observed that the addition of the brominated copolymer of isobutylene and p-methylstyrene compatabilizer with the EVOH inclusion also significantly improved both the air and oxygen permeation resistance as well as compared to Control Sample A and Experimental Sample B.

For Experimental Sample E, it is observed that a reduction in carbon black reinforcement and addition of the reactive alkylphenol-formaldehyde resin significantly improved both the air and oxygen permeation resistance, as compared to Control Sample A as well as Experimental Samples B through D.

Further for Experimental Sample E, by reduction of its carbon black reinforcement content, resulted in a beneficial increase of elongation at break and decrease of hardness at 100° C., as compared to Experimental Sample D. This is considered herein as being significant by creating a desirably softer tire innerliner rubber composition.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic rubber tire having an integral innerliner of a sulfur cured rubber composition comprised of, based upon parts by weight per 100 parts by weight of total rubber (phr),
   (A) 100 phr of elastomers:
   where said elastomers are comprised of:
      (1) butyl type rubber comprised of about 60 to about 95 phr of halobutyl rubber selected from at least one of bromobutyl rubber and chlorobutyl rubber,
      (2) from 5 to 40 phr of diene-based elastomer selected from polymers of at least one of isoprene and 1,3-butadiene and copolymers of styrene and at least one of isoprene and 1,3-butadiene and their mixtures, and
      (3) from 5 to 20 phr of at least one of partially depolymerized bromobutyl rubber, partially depolymerized chlorobutyl rubber and partially depolymerized butyl rubber, and their mixtures, and
   (B) from 30 to about 80 phr of ethylene vinyl alcohol copolymer (EVOH), and
   (C) about 30 to about 110 phr of reinforcing filler consisting of:
      (1) about 30 to about 110 phr of rubber reinforcing carbon black, or
      (2) about 5 to about 70 phr of rubber reinforcing carbon black and from about 25 to about 70 phr of synthetic amorphous precipitated silica aggregates together with a coupling agent having a moiety reactive with hydroxyl groups on said precipitated silica aggregates and another different moiety interactive with said diene-based elastomer(s);
   wherein said rubber composition contains a compatabilizer for said EVOH comprised of at least one of epoxidized natural rubber and brominated copolymers of isobutylene and p-methyl styrene.

2. The tire of claim 1 wherein said compatabilizer is epoxidized natural rubber.

3. The tire of claim 1 wherein said compatabilizer is a brominated copolymer of isobutylene and p-methylstyrene.

4. The pneumatic rubber tire of claim 1 wherein for said innerliner said butyl type rubber is comprised of from about 60 to about 90 phr of said halobutyl rubber which further contains about 5 to about 20 phr of non-halogenated butyl rubber and said diene-based elastomer(s) is present in an amount of from 5 to 30 phr.

5. A pneumatic rubber tire having an integral innerliner of a sulfur cured rubber composition comprised of, based upon parts by weight per 100 parts by weight of total rubber (phr),
   (A) 100 phr of elastomers:
   where said elastomers are comprised of:
      (1) butyl type rubber comprised of about 60 to about 95 phr of halobutyl rubber selected from at least one of bromobutyl rubber and chlorobutyl rubber, and
      (2) from 5 to 40 phr of at least one of partially depolymerized bromobutyl rubber, partially depolymerized chlorobutyl rubber and partially depolymerized butyl rubber, and their mixtures,
   (B) from 30 to about 80 phr of ethylene vinyl alcohol copolymer (EVOH), and
   (C) about 30 to about 110 phr of reinforcing filler consisting of:
      (1) about 30 to about 110 phr of rubber reinforcing carbon black, or
      (2) about 5 to about 70 phr of rubber reinforcing carbon black and from about 25 to about 70 phr of synthetic amorphous precipitated silica aggregates together with a coupling agent having a moiety reactive with hydroxyl groups on said precipitated silica aggregates and another different moiety interactive with said diene-based elastomer(s);
   wherein said rubber composition contains a compatabilizer for said EVOH comprised of at least one of epoxidized natural rubber and brominated copolymers of isobutylene and p-methyl styrene.

6. The pneumatic tire of claim 5 wherein for said innerliner said butyl type rubber is comprised of from about 60 to about 90 phr of said halobutyl rubber which further contains from about 5 to 20 phr of non-halogenated butyl rubber and where said diene-based elastomer(s) is present in an amount of from to 30 phr.

* * * * *